United States Patent [19]
Wszolek

[11] Patent Number: 5,724,613
[45] Date of Patent: Mar. 3, 1998

[54] SYSTEM AND METHOD FOR AUTOMATICALLY ENABLING AND DISABLING A PREFETCHING CAPABILITY

[75] Inventor: Philip Wszolek, Phoenix, Ariz.

[73] Assignee: VLSI Technology, Inc., San Jose, Calif.

[21] Appl. No.: 643,350

[22] Filed: May 6, 1996

[51] Int. Cl.⁶ .............................. G06F 12/00; G06F 13/00
[52] U.S. Cl. .................... 395/853; 395/421.08; 395/280; 395/464
[58] Field of Search ...................... 395/464, 427, 395/853, 854, 855, 878, 584, 383, 280, 309, 421.07, 421.08

[56] References Cited

U.S. PATENT DOCUMENTS

| | | | |
|---|---|---|---|
| 4,371,924 | 2/1983 | Schaefer et al. | 395/464 |
| 4,807,110 | 2/1989 | Pomerene et al. | 395/421.03 |
| 4,853,846 | 8/1989 | Johnson et al. | 395/281 |
| 4,918,587 | 4/1990 | Pechter et al. | 395/421.08 |
| 5,557,750 | 9/1996 | Moore et al. | 395/250 |
| 5,566,324 | 10/1996 | Kass | 395/487 |
| 5,630,094 | 5/1997 | Hayek et al. | 395/473 |

OTHER PUBLICATIONS

Dahlgren et al. "Sequential Hardware Prefetching in Shared Memory Multiprocessors", IEEE Transaction on Parallel Processing Systems, v6 iss7, Jul. 1995.

Zucker et al. "A comparison of Hardware Prefetching Techniques for Multimedia Benchmarks", Multimedia Computing and Systems, 1996 int'l conf., 1996.

*Primary Examiner*—Dinh C. Dung
*Attorney, Agent, or Firm*—Harry M. Weiss; Jeffrey D. Moy; Harry M. Weiss & Associates, P.C.

[57] ABSTRACT

The present invention relates to a system and method which has automatic enabling and disabling capabilities for prefetching and transferring sequentially located data from system memory to a First In First Out (FIFO) queue. When a Peripheral Component Interconnect (PCI) initiator signals for a data read, a minimum unit of data will be transferred from system memory to the FIFO queue. Only after seeing a certain number of consecutive data read requests from the same PCI initiator will the system begin to sequentially prefetch data from system memory and to transfer the prefetched data to the FIFO queue.

16 Claims, 1 Drawing Sheet

SYSTEM AND METHOD FOR AUTOMATICALLY ENABLING AND DISABLING A PREFETCHING CAPABILITY

BACKGROUND OF THE INVENTION

1. Field of the Invention

This invention relates generally to computer systems and, more specifically, to a system and method for automatically enabling and disabling the prefetching of sequentially located data from memory to a First In First Out (FIFO) queue.

2. Description of the Prior Art

Currently, in computer systems where there are two or more Peripheral Component Interconnect (PCI) initiators, as soon as the PCI target interface controller sees a data read request from one of the PCI initiators, the PCI target interface controller signals the memory controller to fill the First In First Out (FIFO) queue with data that is read from the system memory. The memory controller continues to read the data from memory and loads the data into the FIFO queue as long as space is available in the FIFO queue, or until the PCI target interface controller signals the memory controller to stop sending the data.

A problem with the above system occurs when multiple PCI initiators try to read data from the system memory. When this happens, much of the prefetched data in the FIFO queue is effectively "thrown away" when the PCI target interface controller switches to service a request from a different PCI initiator.

Therefore, a need existed to provide a system and method that had the ability to automatically enable and disable a prefetch capability. The system and method would prefetch sequentially located data only after a certain number of consecutive data reads have been requested by the same PCI initiator.

SUMMARY OF THE INVENTION

In accordance with one embodiment of the present invention, it is an object of the present invention to provide a system and method for automatically enabling and disabling a prefetch capability.

It is another object of the present invention to provide a system and method for automatically enabling and disabling a prefetch capability which would prefetch sequentially located data from system memory only after a certain number of consecutive data reads have been requested by the same PCI initiator.

BRIEF DESCRIPTION OF THE PREFERRED EMBODIMENTS

In accordance with one embodiment of the present invention, a system for automatically enabling and disabling a prefetching capability is disclosed. The system is comprised of memory means for storing data in the system. At least two Peripheral Component Interconnect (PCI) initiator means are provided for initiating data reads from the memory means. First In First Out (FIFO) means are coupled to the memory means for storing data transferred from the memory means. PCI target interface controller means are coupled to the at least two PCI initiator means for receiving requests of the data reads from the at least two PCI initiator means, for signalling retrieval of requested data of the data reads from the memory means, and for signalling for prefetching of sequentially located data from the memory means after a predetermined number of consecutive data requests from the same PCI initiator means of the at least two PCI initiator means. Memory controller means are coupled to the PCI target interface controller means and to the memory means for transferring the requested data of the data reads to the FIFO means and for transferring the sequentially located data to the FIFO means after the predetermined number of consecutive data requests from the same PCI initiator means of the at least two PCI initiator means.

In accordance with another embodiment of the present invention, a method of providing a system for automatically enabling and disabling a prefetching capability is disclosed. The method comprises the steps of: providing memory means for storing data in the system; providing at least two PCI initiator means for initiating data reads from the memory means; providing FIFO means coupled to the memory means for storing data transferred from the memory means; providing PCI target interface controller means coupled to the at least two PCI initiator means for receiving requests of the data reads from the at least two PCI initiator means, for signalling retrieval of requested data of the data reads from the memory means, and for signalling for prefetching of sequentially located data from the memory means after a predetermined number of consecutive data requests from the same PCI initiator means of the at least two PCI initiator means; and providing memory controller means coupled to the PCI target interface controller means and to the memory means for transferring the requested data of the data reads to the FIFO means and for transferring the sequentially located data to the FIFO means after the predetermined number of consecutive data requests from the same PCI initiator means of the at least two PCI initiator means.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 1:
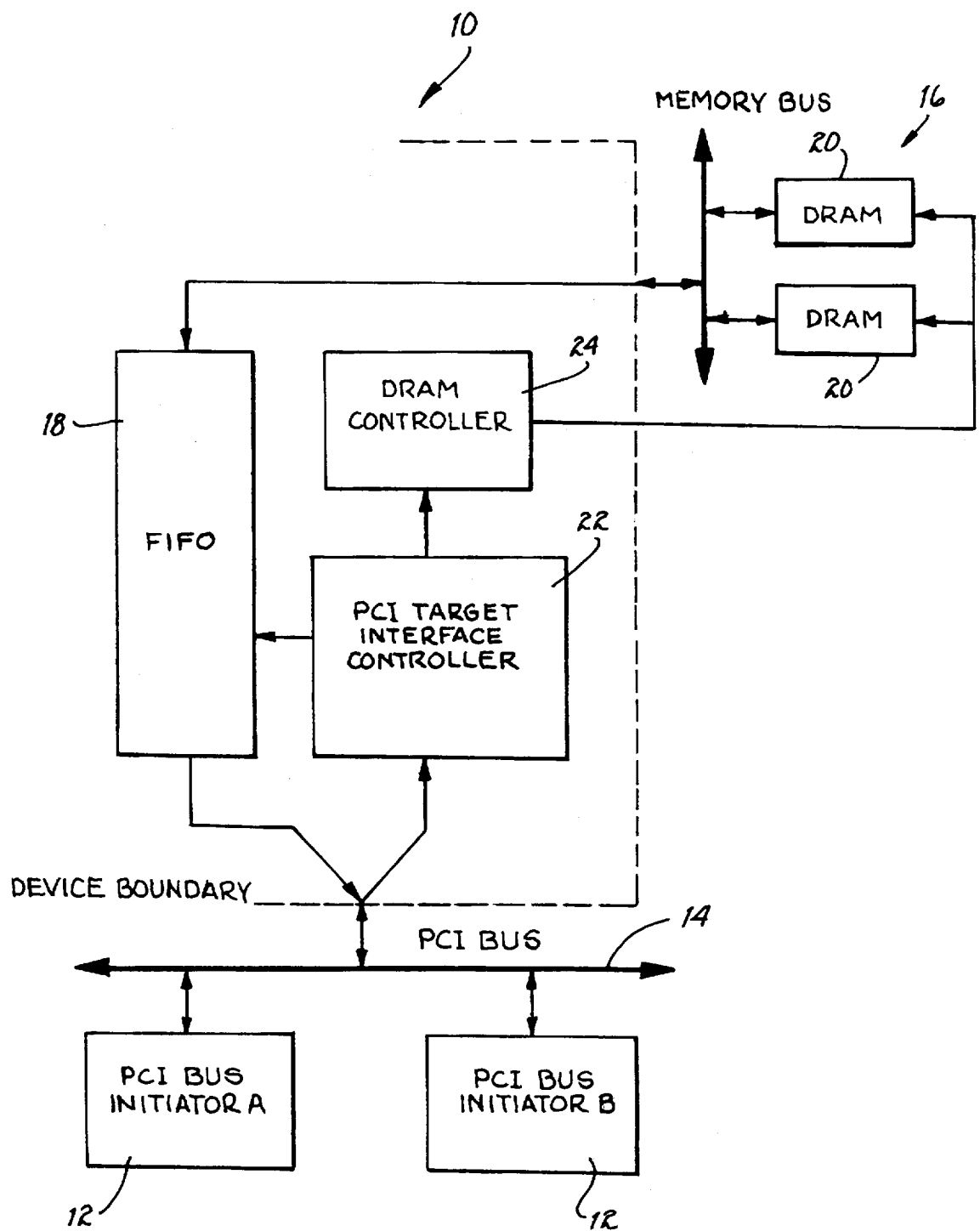
FIG. 1 is a simplified block diagram of a system which has automatic enabling and disabling capabilities for prefetching and transferring sequentially located data from memory to a FIFO queue.

Referring to FIG. 1, a system 10 which has automatic enabling and disabling capabilities for prefetching and transferring data is shown. The system 10 is comprised of at least two Peripheral Component Interconnect (PCI) initiators 12. The PCI initiators 12 are coupled to a PCI bus 14 and generate data read requests when the PCI initiators 12 require system data.

During a data read request, data is sent from the system memory 16 to a First In First Out (FIFO) queue 18. The PCI initiator 12 that requested the data is then able to access the data at a faster rate through the FIFO queue 18 then by continuously reading the data from the system memory 16. In the preferred embodiment of the current invention, the system memory 16 is comprised of a Dynamic Random Access Memory (DRAM).

When a PCI initiator 12 requires system data, the PCI initiator 12 sends a signal to the PCI target interface controller 22 which is also coupled to the PCI bus 14. The PCI target interface controller 22 then sends a signal to the memory controller 24 which is coupled to the PCI target interface controller 22. The PCI target interface controller 22 signals the memory controller 24 to read a minimum unit of data from the system memory 16 and to load this data into the FIFO queue 18. In the preferred embodiment of the present invention, the minimum unit of data that is read by the memory controller 24 is an entire cache line.

Under the system 10, the memory controller 24 would not sequentially fetch data on its own. Thus, the FIFO queue 18 would not be loaded with prefetched data that would need to be "thrown away" when another PCI initiator 12 requests a data read from a different address location in the system memory 16. In this manner, the memory controller 24 would remain available to service requests from the host Central Processing Unit (CPU).

When the PCI target interface controller 22 receives a certain number of consecutive data read request from the same PCI initiator 12, the PCI target interface controller 22 will signal the memory controller 24 to prefetch sequentially located data from the system memory 16 and to transfer the prefetched data to the FIFO queue 18. The memory controller 24 continues to prefetch the data from the system memory 16 and to load this data into the FIFO queue 18 as long as space is available in the FIFO queue 18, or until the PCI target interface controller 22 signals the memory controller 24 to stop prefetching the data.

While the invention has been particularly shown and described with reference to a preferred embodiment thereof, it should be understood by those skilled in the art that changes in form and detail may be made therein without departing from the spirit and scope of the invention.

I claim:

1. A system for automatically enabling and disabling a prefetching capability comprising, in combination:

memory means for storing data in said system;

at least two Peripheral Component Interconnect (PCI) initiator means for initiating data reads from said memory means;

First In First Out (FIFO) means coupled to said memory means for storing data transferred from said memory means;

PCI target interface controller means coupled to said at least two PCI initiator means for receiving requests of said data reads from said at least two PCI initiator means, for signalling retrieval of requested data of said data reads from said memory means, and for signalling for prefetching of sequentially located data from said memory means after a predetermined number of consecutive data requests from at least one PCI initiator means of said at least two PCI initiator means; and memory controller means coupled to said PCI target interface controller means and to said memory means for transferring said requested data of said data reads to said FIFO means and for transferring said sequentially located data to said FIFO means after said predetermined number of consecutive data requests from said at least one PCI initiator means of said at least two PCI initiator means.

2. A system for automatically enabling and disabling a prefetching capability in accordance with claim 1 wherein said memory means comprises a Dynamic Random Access Memory (DRAM).

3. A system for automatically enabling and disabling a prefetching capability in accordance with claim 1 wherein said memory controller means transfers an entire cache line to said FIFO means during said data reads.

4. A system for automatically enabling and disabling a prefetching capability in accordance with claim 1 wherein said predetermined number of consecutive data requests from said at least one PCI initiator means is at least two consecutive data requests.

5. A system for automatically enabling and disabling a prefetching capability in accordance with claim 1 wherein said memory controller means transfers said sequentially located data to said FIFO means as long as space is available in said FIFO means.

6. A system for automatically enabling and disabling a prefetching capability in accordance with claim 1 wherein said memory controller means transfers said sequentially located data to said FIFO means until said PCI target interface controller means signals said memory controller means to stop transferring sequentially located data to said FIFO means.

7. A system for automatically enabling and disabling a prefetching capability comprising, in combination:

DRAM means for storing data in said system;

at least two Peripheral Component Interconnect (PCI) initiator means for initiating data reads from said DRAM means;

FIFO means coupled to said DRAM means for storing data transferred from said DRAM means;

PCI target interface controller means coupled to said at least two PCI initiator means for receiving requests of said data reads from said at least two PCI initiator means, for signalling retrieval of an entire cache line of said data reads from said DRAM means, and for signalling for prefetching of sequentially located data from said DRAM means after a predetermined number of consecutive data requests from at least one PCI initiator means of said at least two PCI initiator means; and DRAM controller means coupled to said PCI target interface controller means and to said DRAM means for transferring said entire cache line of said data read to said FIFO means and for transferring said sequentially located data to said FIFO means after said predetermined number of consecutive data requests from said at least one PCI initiator means of said at least two PCI initiator means.

8. A system for automatically enabling and disabling a prefetching capability in accordance with claim 7 wherein said predetermined number of consecutive data requests from said at least one PCI initiator means is at least two consecutive data requests.

9. A system for automatically enabling and disabling a prefetching capability in accordance with claim 7 wherein said DRAM controller means transfers said sequentially located data to said FIFO means as long as space is available in said FIFO means.

10. A system for automatically enabling and disabling a prefetching capability in accordance with claim 7 wherein said DRAM controller means transfers said sequentially located data to said FIFO means until said PCI target interface controller means signals said DRAM controller means to stop transferring sequentially located data to said FIFO means.

11. A method of providing a system for automatically enabling and disabling a prefetching capability comprising the steps of:

providing memory means for storing data in said system;

providing at least two Peripheral Component Interconnect (PCI) initiator means for initiating data reads from said memory means;

providing First In First Out (FIFO) means coupled to said memory means for storing data transferred from said memory means;

providing PCI target interface controller means coupled to said at least two PCI initiator means for receiving requests of said data reads from said at least two PCI initiator means, for signalling retrieval of requested data of said data reads from said memory means, and for signalling for prefetching of sequentially located data from said memory means after a predetermined number of consecutive data requests from at least one PCI initiator means of said at least two PCI initiator means; and providing memory controller means coupled to said PCI target interface controller means and to said memory means for transferring said requested data of said data reads to said FIFO means and for transferring said sequentially located data to said FIFO means after said predetermined number of consecutive data requests from said at least one PCI initiator means of said at least two PCI initiator means.

12. The method of claim 11 wherein said step of providing memory means further comprises the step of providing a DRAM as said memory means.

13. The method of claim 11 wherein said step of providing memory controller means for transferring said requested data from said data reads to said FIFO means further comprises the step of providing memory controller means for transferring an entire cache line during said data reads to said FIFO means.

14. The method of claim 11 wherein said predetermined number of consecutive data requests from said at least one PCI initiator means is at least two consecutive data requests.

15. The method of claim 11 wherein said step of providing memory controller means further comprises the step of providing memory controller means that transfers said sequentially located data to said FIFO means as long as space is available in said FIFO means.

16. The method of claim 11 wherein said step of providing memory controller means further comprises the step of providing memory controller means that transfers said sequentially located data until said PCI target interface controller means signals said memory controller means to stop transferring sequentially located data to said FIFO means.

* * * * *